United States Patent [19]
Reinheimer

[11] 3,721,827
[45] March 20, 1973

[54] ARRANGEMENT FOR AUTOMATICALLY FOCUSSING AN OPTICAL INSTRUMENT

[75] Inventor: Gunter Reinheimer, Fellingshausen, Germany

[73] Assignee: Ernst Leitz, GmbH, Wetzlar, Germany

[22] Filed: Jan. 17, 1972

[21] Appl. No.: 218,335

[30] Foreign Application Priority Data

Jan. 22, 1971 Germany.................P 21 02 922.1

[52] U.S. Cl..............250/201, 250/83.3 H, 350/46
[51] Int. Cl...........................G01j 1/20, G02b 7/04
[58] Field of Search..........250/201; 350/46; 95/44 C; 355/57; 352/140

[56] References Cited

UNITED STATES PATENTS 2,968,994  1/1961  Shurcliff..............................350/46
3,639,048  2/1972  Heaney et al....................352/140 X Primary Examiner—James W. Lawrence
Assistant Examiner—T. N. Grigsby
Attorney—Krafft & Wells

[57] ABSTRACT

In an optical instrument for viewing an illuminated object by means of an objective lens first reflecting means are provided for so reflecting a bundle of invisible light rays out of the illuminating light that the invisible light again enters the illuminating light in only one half of its cross section. The invisible light is then reflected back from the object into the respective other half of the cross section of the illuminating light where second reflecting means are provided for reflecting the invisible light onto a differential photoelectric means. A reference mark is arranged in the path of the invisible light before it is reflected from the object and an image of the reference mark is produced on the differential photoelectric means. A voltage is generated by the latter when the reference mark appears on one of the photoelectric elements constituting the differential photoelectric means, this being the case whenever the object is not in focus. A setting mechanism is provided which is actuated by the generated voltage for varying the distance between the object and the objective lens sufficiently for bringing the image of the reference mark into focus again.

10 Claims, 12 Drawing Figures

ARRANGEMENT FOR AUTOMATICALLY FOCUSSING AN OPTICAL INSTRUMENT

BACKGROUND OF THE INVENTION

The present invention relates to improvements in an arrangement for focussing an optical instrument onto an object to be viewed by the instrument.

In a known arrangement of this kind it has been proposed to provide a special source of radiation which produces rays only in the spectral range outside the visible light range, for example ultraviolet or infra-red rays, and which with the aid of the invisible bundle of rays is imaged by collecting optical elements (measuring beam projection lens) in the focus of the projector objective. The invisible bundle of rays impinges on an object at an angle of 45° to the optical axis of the projector and is reflected to a photoelectric transducer connected in a differential arrangement. If the focal plane and the object plane coincide in location, none of the photoelectric cells is energized, but if they do not coincide one of the two cells is energized in accordance with the straying of the object out of the focal plane, so as to close a control circuit operating a device which brings the two planes back into coincidence.

With a device of this kind it is disadvantageous that an additional measuring beam projection lens independent of the objective of the projector is associated with the invisible bundle of rays. In addition to the resulting expense it is in fact not simple for the measuring beam projection lens situated in the path of the invisible rays and the projector objective to be aligned in such a manner that they focus on a common point. It is therefore practically impossible to use a device of this kind in apparatus in which lenses of different setting distances are used. For microscopes moreover it cannot be used because the dimensions of the microscope objective are generally so great that they do not permit the invisible bundle of rays to pass into and out of the focus of the microscope objective from the side. In the case of immersion objectives the layer of liquid required between the viewing surface and the front lens makes it quite impossible for a device of the type described above to be used.

It is, therefore, an object of the present invention to provide an arrangement for focussing an optical instrument which overcomes the above described disadvantages and which can be used in connection with microscopes.

SUMMARY OF THE INVENTION

According to the present invention, there is provided an arrangement for focussing an optical instrument onto an object to be viewed by an objective lens, the arrangement comprising means for so projecting a bundle of rays of invisible light defining an image of a reference mark into a beam of light for illuminating the object that the image of the reference mark is confined within only one half of the cross-section of the illuminating beam, the light rays serving to image the reference mark being passed together with the illuminating beam through the objective lens and being reflected back from the object into the respective other half of the illuminating beam, and means for transmitting said rays after reflection from the object to differential photoelectric control means responsive to the relative light distribution to actuate setting means for bringing the object into focus.

It is convenient for the invisible bundle of rays used for imaging the mark to be reflected out of the illuminating beam between the condenser of the light source and an apertured diaphragm and, before the illuminating beam enters the objective lens, to be returned eccentrically to this beam. The procedure may however also comprise supplying the invisible bundle of rays to the illuminating beam of a microscope between the condenser of the light source and the apertured diaphragm. The planes of imaging of the mark, referred to both directions of the invisible bundle of rays, may coincide with the plane of the field diaphragm of the microscope. It is, however, more advantageous that only the portion passing to the object of the invisible bundle of rays used to image the mark should pass through the field diaphragm of the microscope after blocking out one of its halves, and that in the case of the invisible bundle of rays reflected by the object the mark should be imaged in an intermediate image plane of the microscope.

Advantageously the photoelectric control means comprise photoelectric transducers connected in a differential arrangement, together with at least one dark mark which corresponds in size and shape to the mark image produced and which is so disposed that when the focal plane and the viewing surface coincide the mark image coincides with the dark mark and neither side of the photoelectric transducer is energized, whereas when there are differences between the focal plane and the viewing surface one side of the transducer is energized in accordance with displacement of the mark image away from the dark mark. It is particularly advantageous for the dark mark to be provided in the intermediate image plane. In that case, the mounting of the photoelectric transducer is so designed that a predetermined displacement in the intermediate image plane can be effected of the photoelectric transducer comprising receiver sectors and at least one dark mark. It may, however, also be very advantageous for a rotatable, transparent, plane-parallel plate inclined in relation to the axis of the invisible bundle of rays reflected back from the object to be introduced into the optical path of said bundle of rays, and for the photoelectric transducer to be circular and its circular surface to be divided by means of the dark marks into a plurality of receiver sectors.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
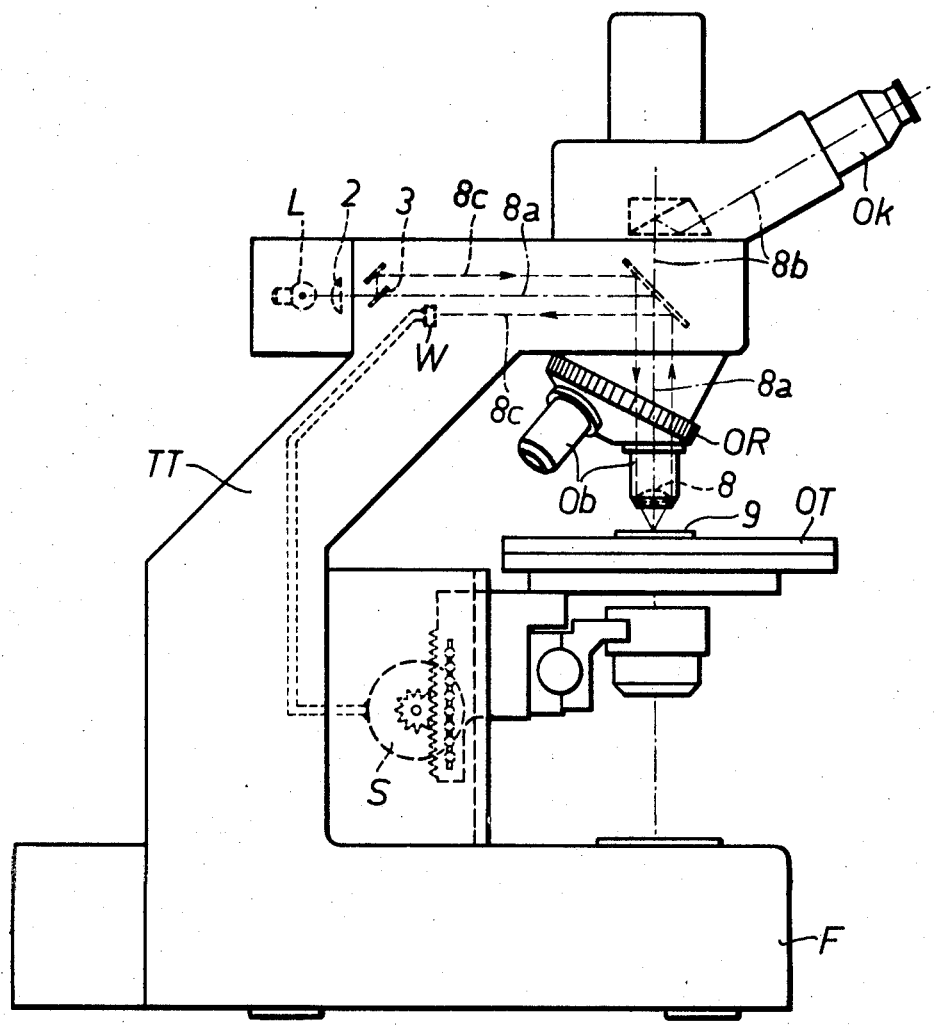
FIG. 1 shows a microscope embodying the invention, the measuring beam being shown diagrammatically.

In FIG. 1, an embodiment of the invention is illustrated diagrammatically with reference to a microscope. The microscope has a base F, a stand TT, a revolving nosepiece OR with objectives Ob, a specimen stage OT and an eyepiece Ok. A light source L illuminates the object 9 lying on the stage. The invisible measuring rays 8c are reflected by means of an infra-red light splitter 3 out of the rays originating from the light source L, and these measuring rays are passed eccentrically to the objective Ob. After impinging on the object 9, the measuring rays are returned by the objective 8, eccentrically again, into the viewing beam 8b and thereupon are reflected out of this beam and passed to a photoelectric transducer W; when the object strays out of the focal plane of the microscope objective the control circuit of this transducer acts in the usual manner on a servomotor S by which the object and the focal plane are brought back into coinciding positions by raising or lowering the microscope stage OT. This automatic correction of the height of the stage can also according to choice be switched off by the microscopician so that the lifting mechanism can also be actuated manually.

Figure 2:
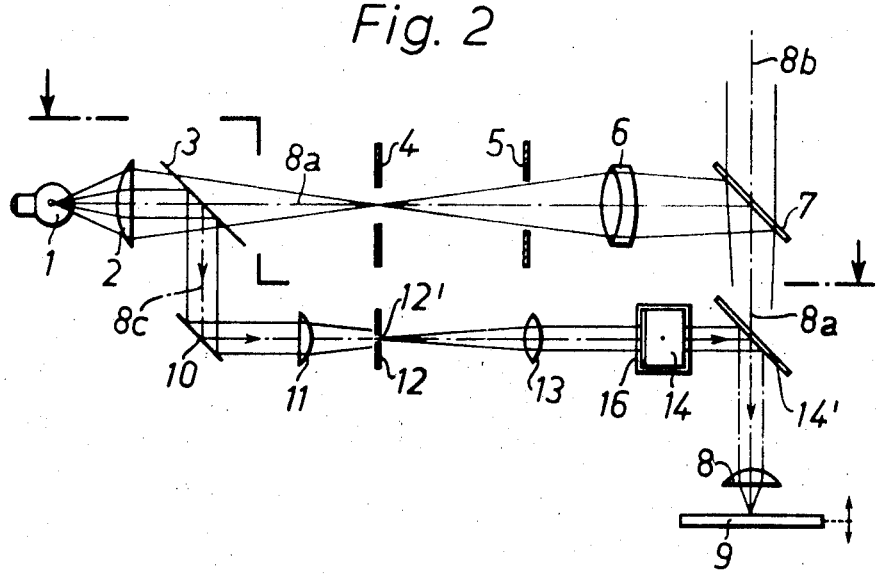
FIGS. 2 and 3 illustrate an example in which a position measuring beam is reflected out of the illuminating beam.
Figure 3:
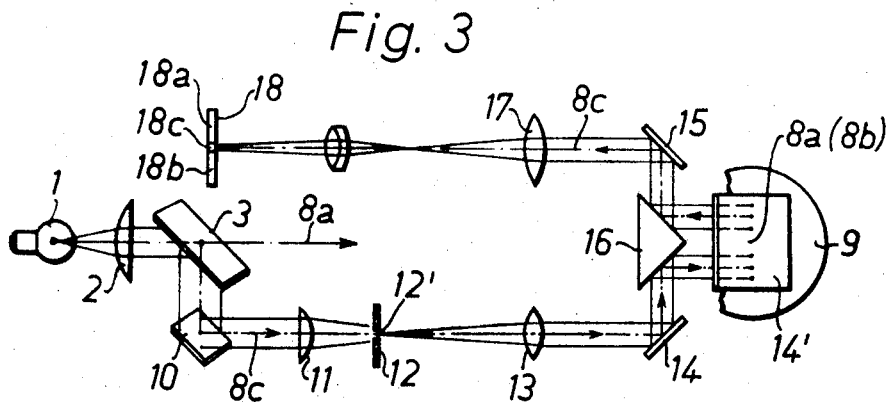

In FIGS. 2 and 3 this mode of operation is illustrated in greater detail. According to these figures, rays pass from a light source 1 in the usual manner through a condenser 2, an apertured diaphragm 4, a field diaphragm 5, a lens 6, and a mirror constructed as a light splitter 7, and also through the microscope objective 8 as vertical illumination to the object 9.

From this illuminating beam 8a, an invisible bundle of rays 8c is reflected out by means of the infra-red light splitter 3. This bundle of rays passes through another mirror 10 and a lens 11, and a slit 12' in a plate 12. The image of this slit 12' is formed at infinity by means of a lens 13 and passes through a mirror 14 to a prism 16 and through the latter by way of another mirror 14' back into the illuminating beam 8a. The prism 16 is so constructed and disposed that the rays 8c imaging the slit 12' are reflected into the microscope objective 8 eccentrically in relation to the axis of the illuminating beam, and thus laterally. The image of the slit 12' lies in the focal plane of the objective 8. The rays impinging on the object 9 are reflected by the latter and thus pass back to the microscope objective 8. In accordance with the law of reflection, the image of the slit 12' now lies on the other side of the illuminating bundle of rays 8a or the viewing bundle of rays 8b. From the latter it is reflected eccentrically once again to the prism 16 by the mirror 14', which is in the form of an infra-red light splitter. From this prism it passes through a mirror 15 and a lens 17 to a photoelectric transducer 18. In the present example the latter has two cells 18a and 18b, which are in the form of receivers and which as part of a differential photometer act in known manner on a servomotor in the event of the object straying out of the focal plane of the microscope objective, this servomotor raising or lowering the microscope stage to bring the object and focal plane back into coincidence.

Figure 4A:
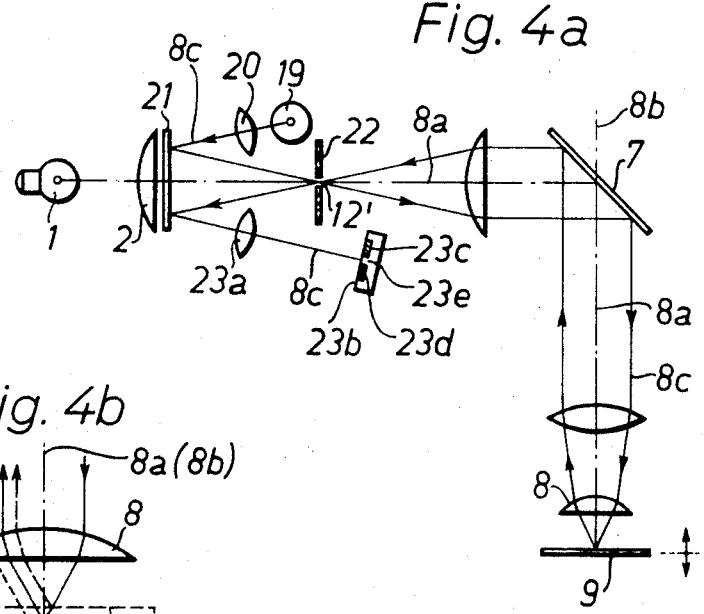
FIGS. 4a to 6 illustrate various embodiments in which a position measuring beam is introduced into the illuminating beam.

In the embodiment illustrated in FIG. 4a, the rays originating from the light source 1 pass once again in known manner through the condenser 2 and the mirror 7 to the objective 8 and thereupon to the object 9. A bundle of infra-red rays 8c originating from an incandescent lamp 19 is reflected into this illuminating beam 8a by way of a lens system 20 and of a plate 21, which reflects the infra-red rays but allows the light coming from the light source 1 to pass through. The bundle of infra-red rays impinges on the plate 21 outside the axis of the illuminating ray bundle 8a and is passed from the latter to another plate 22 which allows the rays of visible light to pass through unhindered, while the bundle of infra-red rays can pass only through a narrow slit 12' in the middle of the plate, that is to say it forms a mark. When the objective is sharply focused on the object and consequently the mark is also imaged on the object, the image of the mark is obtained again in the slit 12' of the plate 22 after reflection. The measuring rays 8c are then reflected on the plate 21 and fall on the lens system 23a. The split is thus imaged again, this time on the zero indicator 23e of the differential photometer 23b. The path of the invisible ray bundle 8c from the incandescent lamp 19 to the differential photometer 23b is indicated in FIG. 4a by the arrows shown therein.

Figure 4B:
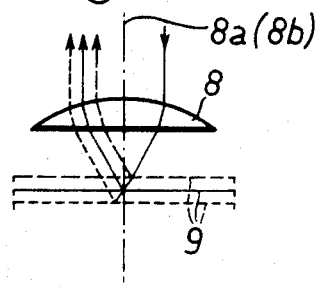

If the object 9 lies outside the focal plane, as shown diagrammatically in FIG. 4b, the image of the mark strays from the zero indicator 23e of the differential photometer 23b in accordance with the straying in the objective 8 which is shown in the drawing (FIG. 4a). One of the cells (23c, 23d) of the photometer receives the signal for the focussing of the object and the corresponding control circuit of the servomotor is closed until the object is once again in sharp focus, and thus the image of the mark falls once again in the center of the zero indicator.

Figure 5:
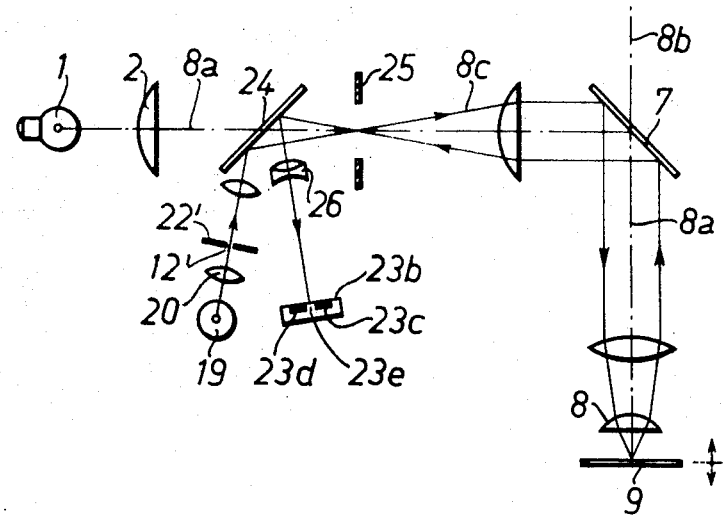

The example illustrated in FIG. 5 differs from that illustrated in FIG. 4a in that a plate 22' provided with a slit 12' lies in the portion of the measuring ray bundle 8c preceding the point where it is reflected into the illuminating beam. A reflecting plate 24 inclined at an angle of 45° serves to reflect it into the latter. When the object is in focus, the slit 12' imaged in the field diaphragm 25 is also automatically imaged on the object, and after reflection is again imaged in the field diaphragm. This image is then enlarged by means of the plate 24 and lens system 26 and passed to the differential photometer 23b.

Figure 6:
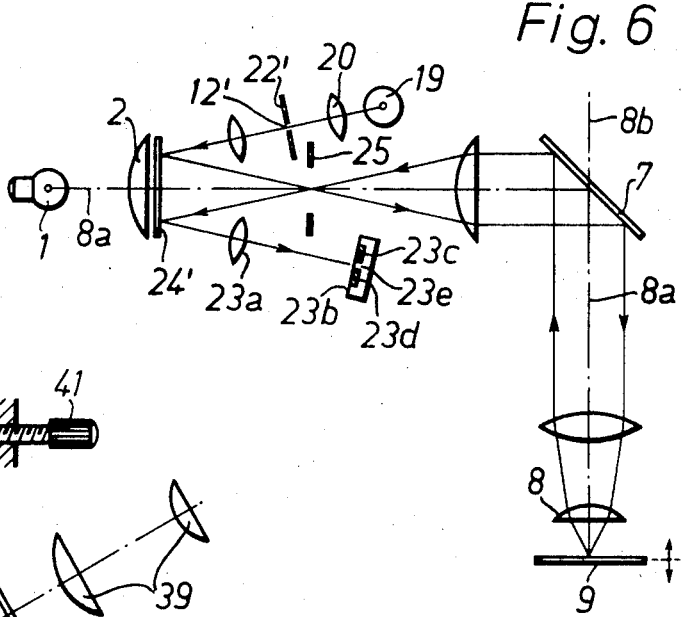

In the example shown in FIG. 6, the embodiment of FIG. 5 is modified by disposing the plate 24' perpendicularly to the axis of the illuminating ray bundle 8a.

Figure 7:
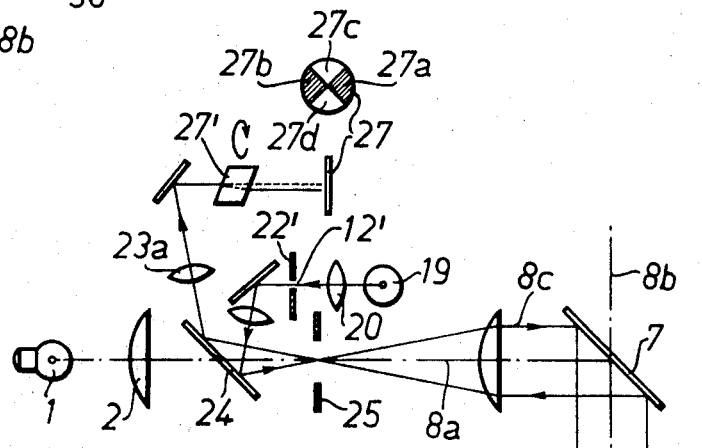
FIG. 7 illustrates an embodiment in which a photoelectric transducer of special construction is provided.

Instead of a differential photometer it is naturally also possible to provide other photoelectric transducers. Thus for example, as illustrated in FIG. 7, a rotating, transparent, plane parallel plate 27' inclined in relation to the axis of the optical path of the measuring rays 8c reflected back from the object 9 and then deflected by the plate 24 can be provided in said optical path, the photoelectric transducer 27 being made circular and its circular surface being subdivided by means of dark marks 27c into receiver sectors 27a and 27b.

Figure 8A:
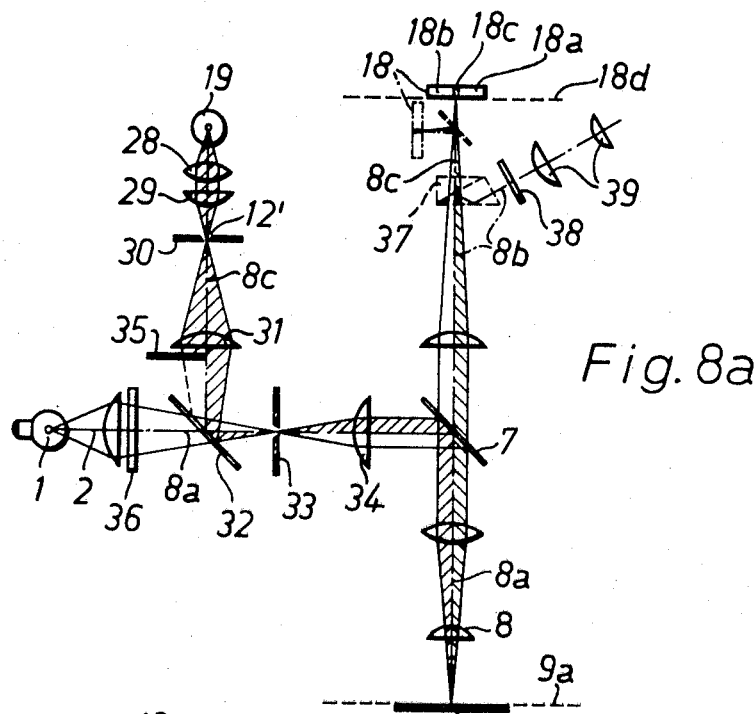
FIGS. 8a to 8c illustrate another example in which the mark reflected back from the object is imaged in the intermediate image plane of the microscope.
Figure 8B:
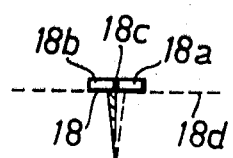
Figure 8C:
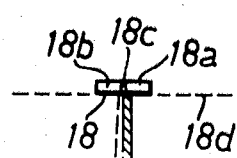

According to FIGS. 8a to 8c, the rays originating from the light source 1 pass through the splitter mirror 7 to the objective 8 and thereupon to the object 9 lying in the focal plane 9a, as in the previous examples. The invisible bundle of rays 8c originating from the incandescent lamp 19 is however here directed to be parallel with the aid of a lens 28, as indicated in FIG. 8a. A lens 29, preferably a cylinder lens, following said lens 28 illuminates a slit 12' of a slit diaphragm 30. With the aid of the lens 31 and of a light splitter 32, this slit is imaged in the plane of the field diaphragm 33. With the aid of the light splitter 7 and the objective 8 the lens 34 images the field diaphragm 33 in the object 9. The half-diaphragm 35 is imaged by means of the lens 34 in the pupil of the objective. An infra-red barrier filter 36 is also provided in the illumination path.

In the imaging beam 8b, the objective 8 here images the object with the image of the mark in an intermediate image plane 18d. In the tube preceding the intermediate image plane 18d is disposed dichromatic light splitter 37, which separates the viewing ray bundle and the measuring ray bundle. The viewing rays are passed through an infra-red barrier filter 38 e.g., to an eyepiece 39 or to a television camera. The measuring rays 8c let through by the dichromatic light splitter 37 produce a slit image on the differential photometer 18. It contains a first photoelectric element 18a and a second photoelectric element 18b and an inactive strip 18c between them. The width of the strip corresponds exactly to the size of the slit 12' imaged. When an object 9 lies exactly in the focal plane 9a (FIG. 8a) none of the photovoltaic elements 18a and 18b receives light. When the object 9 is not in the focal plane, as illustrated in FIGS. 8b and 8c, one of the photovoltaic cells 18a or 18b receives light. A servomotor is brought into action with the aid of an amplifier. This displaces the setting mechanism of the microscope stage until the photovoltaic elements 18a and 18b supply no more current. The object is then again exactly in focus.

Figure 9:
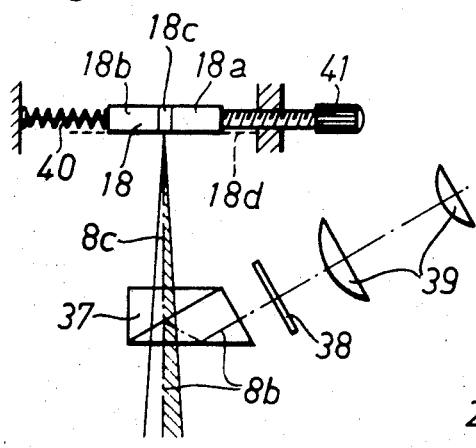
FIG. 9 shows a setting device for the photoelectric transducer.

In FIG. 9, there is shown a portion of the embodiment represented in the FIGS. 8a – 8c with the setting device for the photoelectric transducer drawn in. By means of a finely driven setting screw 41 and a pressure spring 40, the photoelectric transducer 18 lying in the intermediate image plane 18d of the microscope can be deliberately displaced within this plane 18d. It is hereby possible to undertake a very accurate adaption of the photoelectric elements 18a and 18b to the respectively employed objective. This measure can become necessary on changing the objective, since even with an accurate replacement guidance of the objectives, tolerances leading to a falsification of the measuring results can arise in respect of an exact alignment with the photoelectric transducer.

Moreover, a conscious displacement of the photoelectric transducer, and thereby a deliberately set lack of sharpness (defocusing) of the microscopic image is advantageous for example in the case of etched surface structures of metals.

Although the invention has been described above with reference to its application to a microscope, the invention may be applied to any suitable optical apparatus.

What is claimed is:

1. An arrangement for focussing an optical instrument onto an object illuminated by a light source and to be viewed by an objective lens, said arrangement comprising
   a. means for so projecting a bundle of rays of invisible light into a beam of said light source for illuminating said object that said bundle of invisible light rays is confined within only one half of the cross-section of said illuminating beam, said bundle of invisible light rays being then reflected back from said object into the respective other half of said illuminating beam;
   b. a reference mark arranged in the path of said bundle of invisible light so that an image of said reference mark is projected onto said object from where it is reflected back into the respective other half of said illuminating beam;
   c. reflecting means for reflecting said bundle of invisible light out of the path of said respective other half of said illuminating beam;
   d. differential photoelectric means arranged in the path of said bundle of invisible light reflected out of the path of said other half of said illuminating beam, said means comprising a first photoelectric element and a second photoelectric element and an inactive strip between them, said differential photoelectric means generating a voltage when said image of said reference mark appears on one of said photoelectric elements, this being the case whenever said object is not in focus of said objective lens; and
   e. a setting mechanism for varying the distance between said object and said objective lens, said mechanism being actuated by said voltage generated by said differential photoelectric means until said object has been displaced sufficiently that no invisible light impinges on said first or second photoelectric element.

2. An arrangement as claimed in claim 1, wherein the bundle of rays used to image said reference mark is reflected out of the illuminating beam between a condenser through which the illuminating beam is transmitted and an apertured diaphragm, and is returned eccentrically to the illuminating beam before the latter enters the objective lens.

3. An arrangement as claimed in claim 1, wherein the bundle of rays used for imaging said reference mark is passed eccentrically to the illuminating beam between a condenser through which the illuminating beam is transmitted and an apertured plate serving as a light field diaphragm.

4. An arrangement as claimed in claim 3, wherein the imaging planes of said reference mark, referred to both directions of the bundle of rays, coincide with the plane of the apertured plate.

5. An arrangement as claimed in claim 3, wherein only that part of said bundle of rays used for imaging the reference mark which passes to the object passes through a field aperture of a microscope after one of its halves has been blocked out, and said bundle of rays reflected back from the object is used to image said reference mark in an intermediate image plane of the optical instrument.

6. An arrangement as claimed in claim 1, wherein the differential photoelectric means comprises photoelectric transducers connected in a differential arrangement, together with at least one inactive strip which corresponds in size and shape to the imaged reference mark and which is so disposed that when the focal plane and the viewing surface coincide said imaged reference mark coincides with the inactive strip and neither side of the photoelectric transducer is energized whereas, when there are differences between the focal plane and the viewing surface, one side of the transducer is energized in accordance with the movement of said imaged reference mark relative to the inactive strip.

7. An arrangement as claimed in claim 6, wherein the inactive strip is provided in the intermediate image plane of the optical instrument.

8. An arrangement as claimed in claim 1, wherein the differential photoelectric means is circular and its circular surface is sub-divided by means of the inactive portions into a plurality of receiver sectors, said means being arranged inclined in relation to the axis of said bundle of rays reflected back from the object.

9. An arrangement as claimed in claim 1, wherein said bundle of invisible light rays defining an image of said reference mark comprises rays of infra-red light energy.

10. An arrangement as claimed in claim 1, wherein said bundle of invisible light rays defining an image of said reference mark comprises rays of ultra-violet light energy.

* * * * *